US010049573B1

(12) United States Patent
Surnilla et al.

(10) Patent No.: US 10,049,573 B1
(45) Date of Patent: Aug. 14, 2018

(54) ACTIVE PARK ASSIST DETECTION OF SEMI-TRAILER OVERHANG

(71) Applicant: Ford Global Technologies, LLC, Dearborn, MI (US)

(72) Inventors: Gopichandra Surnilla, West Bloomfield, MI (US); Daniel A. Makled, Dearborn, MI (US); Michael McQuillen, Warren, MI (US); Ali Ahmad Ayoub, Windsor (CA); Jeremy Ferack, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/494,373

(22) Filed: Apr. 21, 2017

(51) Int. Cl.
*B60Q 1/48* (2006.01)
*G08G 1/14* (2006.01)

(52) U.S. Cl.
CPC .................................... *G08G 1/145* (2013.01)

(58) Field of Classification Search
CPC combination set(s) only.
See application file for complete search history.

(56) References Cited

U.S. PATENT DOCUMENTS 8,401,235 B2 3/2013 Lee
8,493,236 B2 7/2013 Boehme et al.
9,381,859 B2 * 7/2016 Nagata .................. B60Q 9/007
2003/0060972 A1 3/2003 Kakinami
2008/0238643 A1 * 10/2008 Malen ..................... B60Q 9/00 340/438
2010/0259420 A1 * 10/2010 Von Reyher ......... B62D 15/028 340/932.2
2014/0300504 A1 10/2014 Shaffer et al.
2016/0153778 A1 2/2016 Singh et al.

FOREIGN PATENT DOCUMENTS

JP 5918683 5/2016

OTHER PUBLICATIONS

Core System Requirements Specification (SyRS), Jun. 30, 2011, Research and Innovative Technology Administration.

* cited by examiner

*Primary Examiner* — Travis Hunnings
(74) *Attorney, Agent, or Firm* — James P. Muraff; Neal, Gerber & Eisenberg LLP

(57) ABSTRACT

Method and apparatus are disclosed for active park assist detection of semi-trailer overhang. An example vehicle includes a first range detection sensor, a second range detection sensor different from the first range detection sensor, and a parking assist unit. The parking assist unit detects, with the first and second range detection sensors, a second vehicle with an overhang adjacent to a parking space. Additionally, the parking assist unit broadcasts, with a DSRC module, a message including properties of the parking space accounting for the overhang.

15 Claims, 6 Drawing Sheets

ACTIVE PARK ASSIST DETECTION OF SEMI-TRAILER OVERHANG

TECHNICAL FIELD

The present disclosure generally relates to assisted parking of a vehicle and, more specifically, active park assist detection of semi-trailer overhang.

BACKGROUND

A semi-autonomous vehicle is a vehicle that is normally operated by a driver, but certain specialized functions are autonomous. For example, some vehicles have adaptive cruise control or autopilot that facilitates, in certain circumstances, the vehicle controlling its speed and following distance independent of driver controlling input. Increasingly, vehicles are equipped with parking assist functions that will park the vehicle.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for active park assist detection of semi-trailer overhang. An example vehicle includes a first range detection sensor, a second range detection sensor different from the first range detection sensor, and a parking assist unit. The parking assist unit detects, with the first and second range detection sensors, a second vehicle with an overhang adjacent to a parking space. Additionally, the parking assist unit broadcasts, with a DSRC module, a message including properties of the parking space accounting for the overhang.

An example method includes detecting, with first and second range detection sensors, a second vehicle with an overhang adjacent to a parking space. The second range detection sensor is different from the first range detection sensor. The method also includes determining properties of the parking space accounting for the overhang. Additionally, the method includes broadcasting, with a DSRC module, a message including the properties of the parking space.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
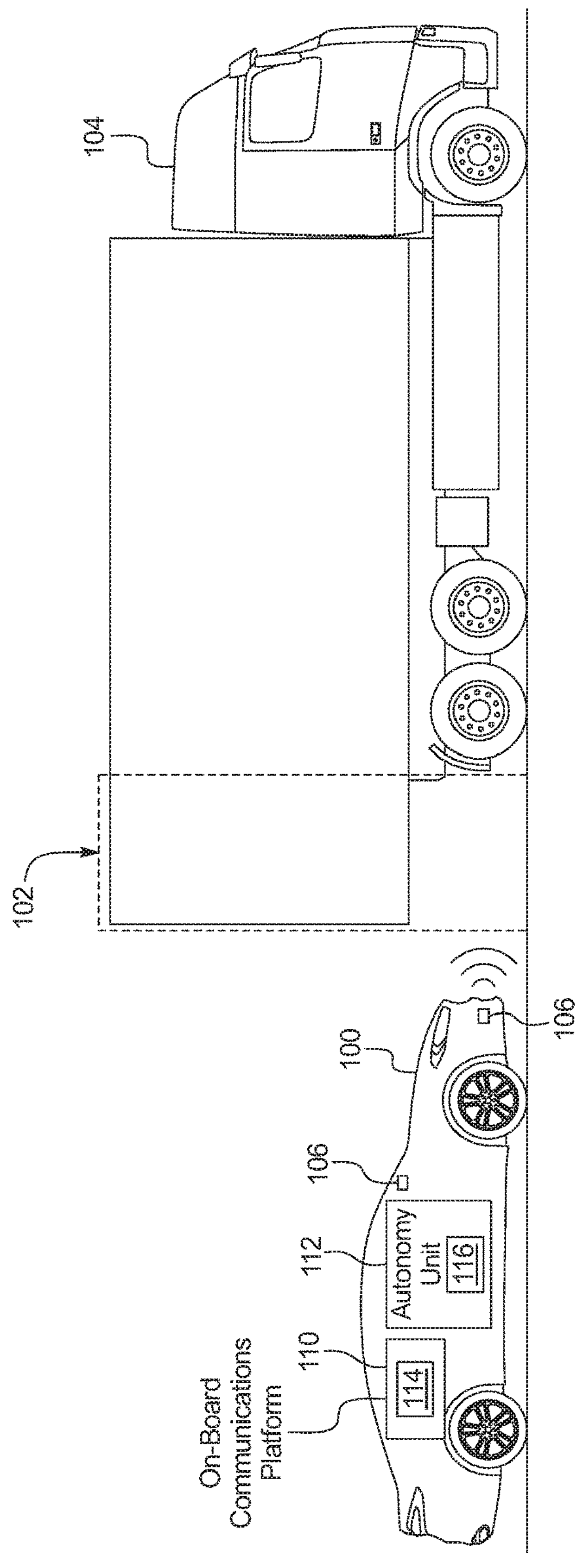
FIGS. 1 and 2 illustrate a vehicle detecting an overhang on a semi-trailer in accordance with the teachings of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Increasingly, vehicles are being manufactured with autonomous features, which control the motive functions of the vehicle in certain circumstances. Specifically, vehicles are being equipped with active park assist systems. Active park assist systems use ultrasonic sensors to determine dimensions of potential parking spots and determine a path to park (e.g., parallel park) the vehicle into an available parking spot. In some vehicles, a driver controls the acceleration and deceleration of the vehicle, and the active park assist system controls the steering of the vehicle long the determined path. In other vehicles, the active park assist system controls both the acceleration/deceleration and the steering of the vehicle (sometimes referred to as "fully active park assist"). Average sized sedans and SUVs sit far lower than a truck, especially semi-trailers or flatbed tow trucks. The ultrasonic sensors are typically mounted lower on the side of the front fascia.

Because the ultrasonic sensors are positioned to detect curbs and vehicles at ground level, they only detect the very rear axle of a truck. As a result, the ultrasonic sensors do not detect the trailers that overhang distance from the vehicle. The overhang is not calculated in trajectory planning and the active park assist system determines that the parking space is larger than it actually is. This results in poor trajectory planning and the acceptance of invalid parking slots. For example, when the active park assist system has found a parallel parking space, the initial maneuver which counter steers the vehicle may not have incorporated the distance from the trailer back, which can lead to inappropriate trajectory calculations and/or even accidents.

As described below, when a vehicle is parking, the vehicle detects the overhang of a trailer using other sensors of the vehicle, such as cameras and/or LiDAR. When an overhang is detected, the vehicle broadcasts a message via vehicle-to-vehicle communication which includes the location and dimensions of the overhang, and the time. Alternatively or additionally, in some examples, the vehicle uploads the location and dimensions of the overhang and the time to a navigation system. As used herein, the navigation system is an application that provides navigation information and/or navigation-related features and is connected to a remote server and/or database. The navigation systems may, for example, be maintained by a mapping service (e.g., Google Maps™, Waze®, Apple Maps™, etc.) and/or vehicle manufacturer (e.g., FordPass™, etc.), etc. When a vehicle detects a parking space with range detection sensors, the vehicle may not include sensors to detect if any vehicle with overhang is adjacent to the parking spot. In some examples, the vehicle may receive the message about the overhang via vehicle-to-vehicle communication. Alternatively or additionally, in such examples, the vehicle may download the information regarding the overhang via a navigation system. In such a manner, vehicles that can detect the overhang can provide information for vehicles that can't detect the overhang. Using the information regarding the overhang, a parking assist unit scans the potential parking space to determine its dimensions taking into account the overhang. The parking assist unit then calculates a trajectory to park the vehicle into the parking space. In a semi-autonomous vehicle, the parking assist unit controls the steering of the vehicle along the calculated trajectory, and a driver controls the acceleration and deceleration of the vehicle. In an autonomous vehicle, the parking assist unit controls both the steering and acceleration and deceleration of the vehicle.

In some examples, the vehicle detects overhangs even when not engaged in parking. In such examples, when the vehicle is traveling on a road adjacent to potential parking spaces, the vehicle uses ultrasonic sensor and camera/LiDAR sensor(s) to detect parking spaces and overhangs. When a parking space is located, the vehicle transmits a message via vehicle-to-vehicle communication and/or uploads to a navigation system the location of the parking space, the time, and the dimensions of any detected overhang.

Figure 2:
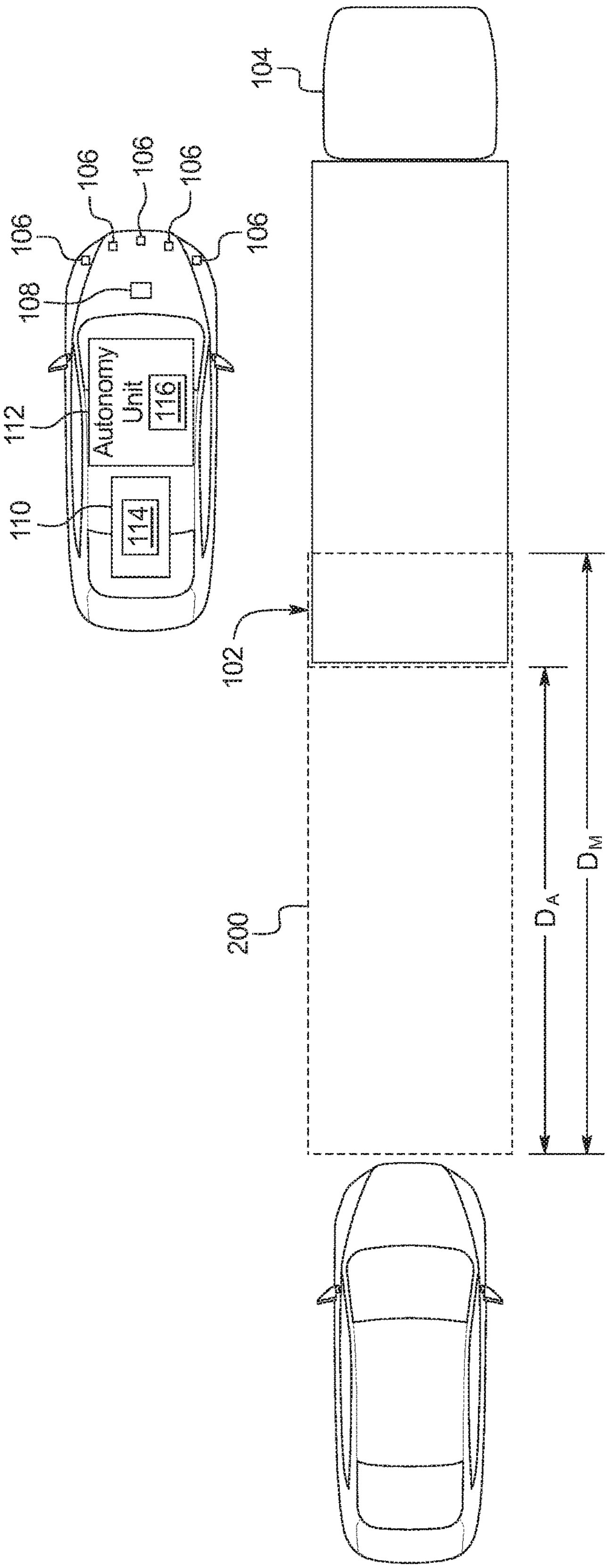

FIGS. 1 and 2 illustrate a vehicle 100 detecting an overhang 102 on a semitrailer 104 in accordance with the teachings of this disclosure. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be semi-autonomous (e.g., some routine motive functions controlled by the vehicle 100) or autonomous (e.g., motive functions are controlled by the vehicle 100 without direct driver input). In the illustrated example, the vehicle 100 includes sensors 106 and 108, an on-board communications platform 110, and an autonomy unit 112.

Sensors may be arranged in and around the vehicle 100 in any suitable fashion. The sensors may be mounted to measure properties around the exterior of the vehicle 100. Additionally, some sensors may be mounted inside the cabin of the vehicle 100 or in the body of the vehicle 100 (such as, the engine compartment, the wheel wells, etc.) to measure properties in the interior of the vehicle 100. For example, such sensors may include accelerometers, odometers, tachometers, pitch and yaw sensors, wheel speed sensors, microphones, tire pressure sensors, and biometric sensors, etc. In the illustrated example, the sensors include ultrasonic sensors 106 and range detection sensors 108.

The ultrasonic sensors 106 are embedded in the front and rear of the vehicle 100. In some examples, the ultrasonic sensors 106 are embedded into the bumper assemblies and/or the fenders of the vehicle 100. The ultrasonic sensors 106 detect objects around the vehicle 100. However, because the area of detection for the ultrasonic sensors 106 is relatively narrow, objects above the ground, such as the overhang 102 of the semitrailer 104, may not be detected.

The range detection sensors 108 include LiDAR and/or cameras. The range detection sensors 108 are positioned so that they are above the ultrasonic sensors 106. For example, the range detection sensors 108 may be positioned on the dashboard, the rearview mirror and/or the roof of the vehicle 100. The range detection sensors 108 detect objects around the vehicle 100. Through image recognition and/or depth analysis, the range detection sensors 108 detect objects above the ground. In some examples, the combination of the ultrasonic sensors 106 and range detection sensors 108 are used to determine whether there is a vehicle 104 with an overhang 102. For example, if range detection sensors 108 detect an object a first distance away at a height of five feet and the ultrasonic sensors 106 do not detect the object at the first distance, it may be inferred that there is an overhang 102. In some examples, then the range detection sensor 108 is a camera, the existence of the overhang 102 is directly detected through analysis of images captured by the camera.

The on-board communications platform 110 includes wireless network interfaces to enable communication with external networks. The on-board communications platform 110 also includes hardware (e.g., processors, memory, storage, antenna, etc.) and software to control the wireless network interfaces. In the illustrated example, the on-board communications platform 110 includes one or more communication controllers for standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m); Near Field Communication (NFC); local area wireless network (including IEEE 802.11 a/b/g/n/ac or others), and Wireless Gigabit (IEEE 802.11ad), etc.). The external network(s) may be a public network, such as the Internet; a private network, such as an intranet; or combinations thereof, and may utilize a variety of networking protocols now available or later developed including, but not limited to, TCP/IP-based networking protocols. In some examples, the vehicle communicatively couples to a navigations system via the on-board communications platform 110.

In the illustrated example, the on-board communications platform 110 includes a dedicated short range communication (DSRC) module 114. The example DSRC modules 114 include antenna(s), radio(s) and software to broadcast messages and to establish connections between the vehicles, infrastructure-based modules (not shown), and mobile device-based modules (not shown). More information on the DSRC network and how the network may communicate with vehicle hardware and software is available in the U.S. Department of Transportation's Core June 2011 System Requirements Specification (SyRS) report (available at http://www.its.dot.gov/meetings/pdf/CoreSystem_SE_SyRS_RevA%20(2011-06-13).pdf), which is hereby incorporated by reference in its entirety along with all of the documents referenced on pages 11 to 14 of the SyRS report. DSRC systems may be installed on vehicles and along roadsides on infrastructure. DSRC systems incorporating infrastructure information is known as a "roadside" system. DSRC may be combined with other technologies, such as Global Position System (GPS), Visual Light Communications (VLC), Cellular Communications, and short range radar, facilitating the vehicles communicating their position, speed, heading, relative position to other objects and to exchange information with other vehicles or external computer systems. DSRC systems can be integrated with other systems such as mobile phones.

Currently, the DSRC network is identified under the DSRC abbreviation or name. However, other names are sometimes used, usually related to a Connected Vehicle program or the like. Most of these systems are either pure DSRC or a variation of the IEEE 802.11 wireless standard. However, besides the pure DSRC system it is also meant to cover dedicated wireless communication systems between cars and roadside infrastructure system, which are integrated with GPS and are based on an IEEE 802.11 protocol for wireless local area networks (such as, 802.11p, etc.).

The autonomy unit 112 controls the autonomous features of the vehicle 100. When the vehicle 100 is autonomous, the autonomy unit 112 coordinates and controls the subsystems of the vehicle 100 to navigate without driver input. When the vehicle is semi-autonomous, the autonomy unit 112 controls the autonomous features of the vehicle 100 when the autonomous features (e.g., adaptive cruise control, lane centering, parking assistance, and highway assist, etc.) are activated by the driver and requirements for using the features are met. For example, when the vehicle 100 is semi-autonomous and active parking assist is activated, the autonomy unit 112 determines the dimensions of a parking space (including the dimensions of the overhang 102), calculates a trajectory into the parking space, and controls the steering of the vehicle 100 to park the vehicle 100 into the parking space following the trajectory. In the illustrated example, the autonomy unit 112 includes a parking assist unit 116.

The parking assist unit 116 detects and provides information regarding overhangs 102. When the vehicle 100 is parking, the parking assist unit 116 detects the overhang 102 of the semitrailer 104 using sensor 106 and 108. When the overhang 102 is detected, the parking assist unit 116, via the DSRC module 114, broadcasts a message regarding the overhand 102. Alternatively or additionally, in some examples, the parking assist unit 116 provides the information to a navigation system maintained by a mapping service (e.g., Google Maps™, Waze®, Apple Maps™, etc.) and/or a vehicle manufacturer (e.g., FordPass™, etc.), etc. The information about the overhang 102 includes the location of the overhang 102, the time at which the overhang 102 was detected, and/or the dimensions of the overhang 102.

Additionally, when a vehicle without overhang detection detects a parking space with its ultrasonic sensors 106, the vehicle may receive the message about the overhang via its DSRC module 114 and/or the navigation system. Using the information regarding the overhang, a parking assist unit 116 scans the potential parking space to determine its dimensions taking into account the overhang 102. In the illustrated example of FIG. 2, when then vehicle 100 scans the parking space 200 with the ultrasonic sensors 106, the parking assist unit 116 determines the measured dimension ($D_M$). By measuring with the range detection sensors 108, receiving a message via the DSRC module 114, and/or receiving information from the navigation system, the parking assist unit 116 determines the actual dimensions ($D_A$) taking into account the dimensions of the overhang 102. The parking assist unit 116 then calculates a trajectory to park the vehicle 100 into the parking space 200. In a semi-autonomous vehicle, the parking assist unit 116 controls the steering of the vehicle 100 along the calculated trajectory, and a driver controls the acceleration and deceleration of the vehicle 100. In an autonomous vehicle, the parking assist unit 116 controls both the steering and acceleration and deceleration of the vehicle 100.

In some examples, the parking assist unit 116 detects the overhang 102 even when not engaged in parking. In such examples, when the vehicle 100 is traveling on a road adjacent to potential parking spaces, the parking assist unit 116 uses the ultrasonic sensor 106 and range detection sensors 108 to detect parking spaces and overhangs. When the parking space 200 is located, the parking assist unit 116 transmits the message via the DSRC module 114 and/or uploads to a navigation system the location of the parking space 200, the time, and the dimensions of any detected overhang 102.

Figure 3:
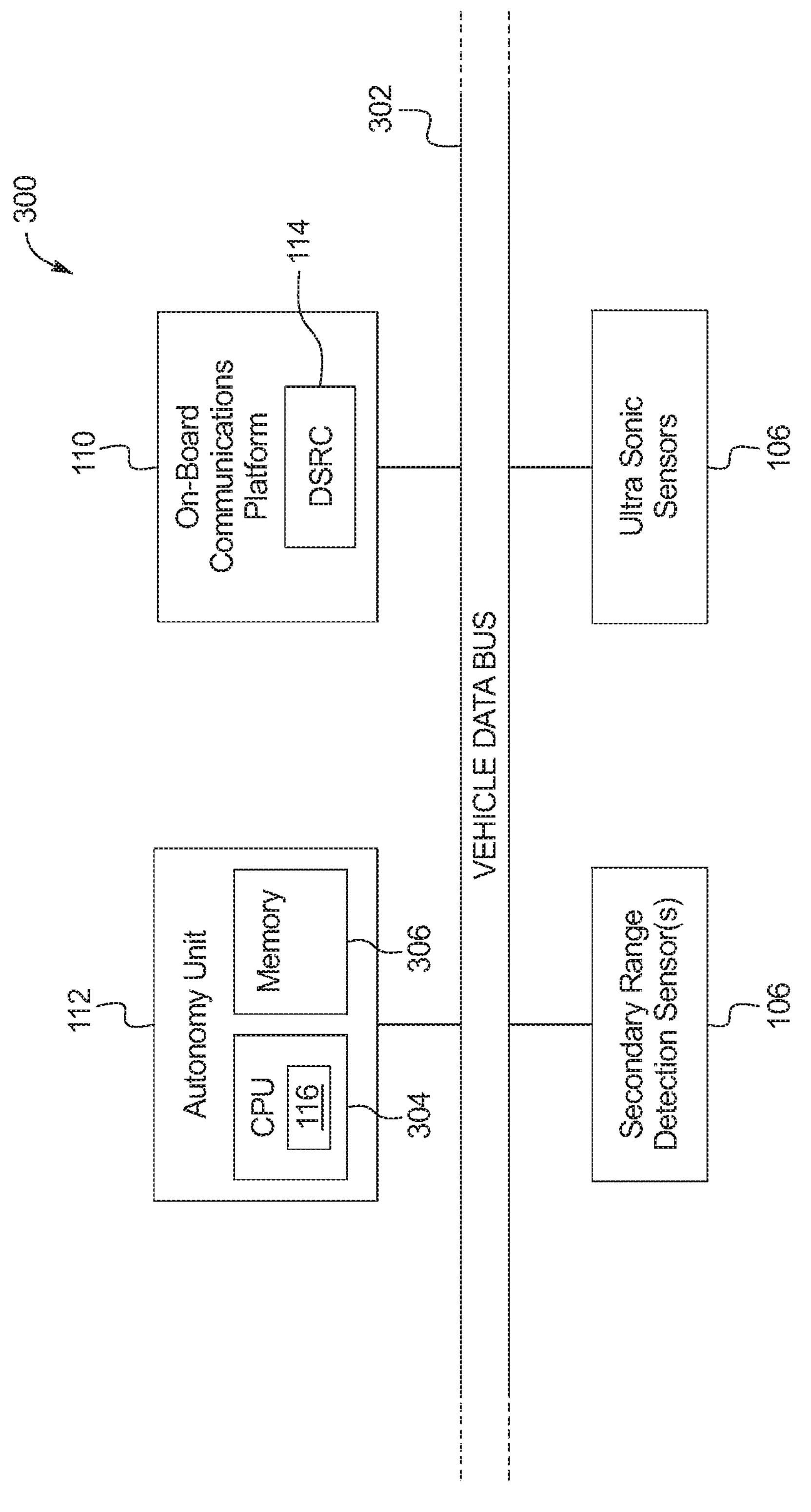
FIG. 3 is a block diagram of electronic components of the vehicle of FIG. 1.

FIG. 3 is a block diagram of electronic components 300 of the vehicle 100 of FIG. 1. In the illustrated example, the electronic components 300 include the sensors 106 and 108, the on-board communications module 110, the autonomy unit 112, and a vehicle data bus 302.

The autonomy unit 112 includes a processor or controller 304 and memory 306. In the illustrated example, the autonomy unit 112 is structured to include the parking assist unit 116. Alternatively, in some examples, the parking assist unit 116 is separate electronic control unit (ECU) with its own processor and memory. The processor or controller 304 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 306 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 306 includes multiple kinds of memory, particularly volatile memory and non-volatile memory.

The memory 306 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 306, the computer readable medium, and/or within the processor 304 during execution of the instructions.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

The vehicle data bus 302 communicatively couples the sensors 106 and 108, the on-board communications module 110, and the autonomy unit 112. In some examples, the vehicle data bus 302 includes one or more data buses. The vehicle data bus 302 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 4:
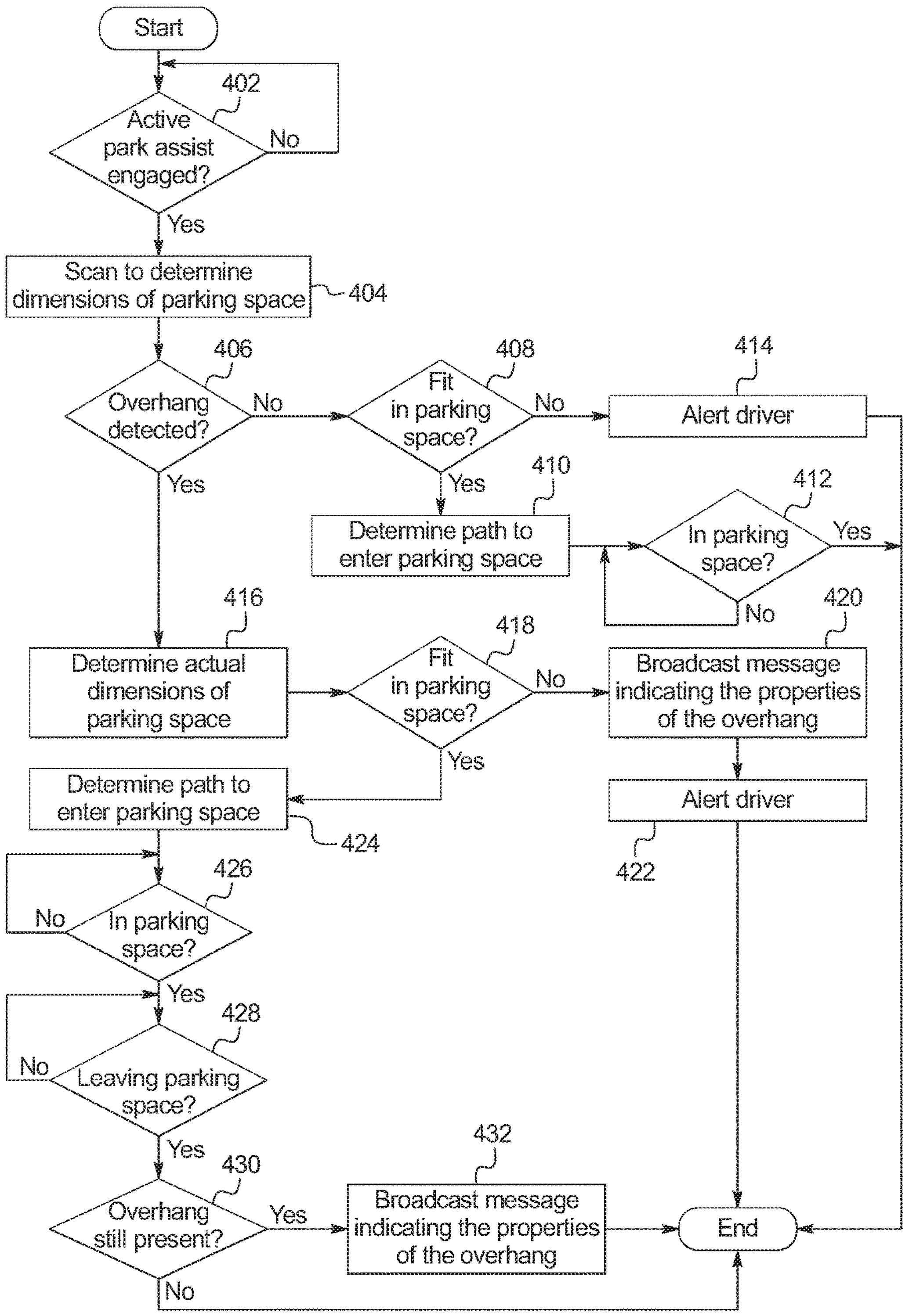
FIGS. 4 and 5 are flowcharts of methods to notify other vehicles of the detected overhang on a semi-trailer, which may be implemented by the electronic components of FIG. 3.

FIG. 4 is a flowchart of a method to notify other vehicles of the detected overhang 102 on a semitrailer 104, which may be implemented by the electronic components 300 of FIG. 3. Initially, at block 402, the parking assist unit 116 waits unit active park assist is engaged. At block 404, the parking assist unit 116 scans a potential parking space (e.g., the parking space 200 of FIG. 2) to determine its dimensions. At block 406, the parking assist unit 116 determines whether an overhang 102 is detected. The parking assist unit 116 detects overhangs 102 using the ultrasonic sensors 106 and the range detection sensors 108 to characterize the parking space 200 at different heights. When an overhang 102 is not detected, the method continues to block 408. Otherwise, when an overhang 102 is detected, the method continues at block 416.

At block 408, the parking assist unit 116 determines whether the vehicle 100 fits within the parking space 200. When the vehicle 100 fits within the parking space 200, the method continues at block 410. When the vehicle 100 does not fit within the parking space 200, the method continues at block 414. At block 410, the parking assist unit 116 determines a trajectory into the parking space 200. At block 412, the parking assist unit 116 waits until the vehicle 100 is parked in the parking space 200. At block 414, the parking assist unit 116 alerts the driver (e.g., via an indicator light on a dashboard display and/or a message on a center console display, etc.).

At block 416, the parking assist unit 116 determines the actual dimensions ($D_A$) of the parking space 200. In some examples, to determine the actual dimensions ($D_A$), the parking assist unit 116 subtracts the dimensions of the overhang 102 from the measured dimension (DM) of the parking space 200. At block 418, the parking assist unit 116 determines whether the vehicle 100 fits within the parking space 200. When the vehicle 100 fits within the parking space 200, the method continues at block 424. When the vehicle 100 does not fit within the parking space 200, the method continues at block 420.

At block 420, the parking assist unit 116 broadcasts a message with the properties of the overhang 102 via the DSRC module 114. Alternatively or additionally, in some examples, the parking assist unit 116 provides the navigation system with properties of the overhang 102. At block 422, the parking assist unit 116 alerts the driver (e.g., via an indicator light on a dashboard display and/or a message on a center console display, etc.).

At block 424, the parking assist unit 116 determines a trajectory into the parking space 200. At block 426, the parking assist unit 116 waits until the vehicle 100 is parked in the parking space 200. At block 428, the parking assist unit 116 waits until the vehicle 100 is leaving the parking space 200. At block 430, the parking assist unit 116 determines whether the overhang 102 is still present. At block 432, when the overhang 102 is still present, the parking assist unit 116 broadcasts a message with the properties of the overhang 102 via the DSRC module 114. Alternatively or additionally, in some examples, the parking assist unit 116 provides the navigation system with properties of the overhang 102.

Figure 5:
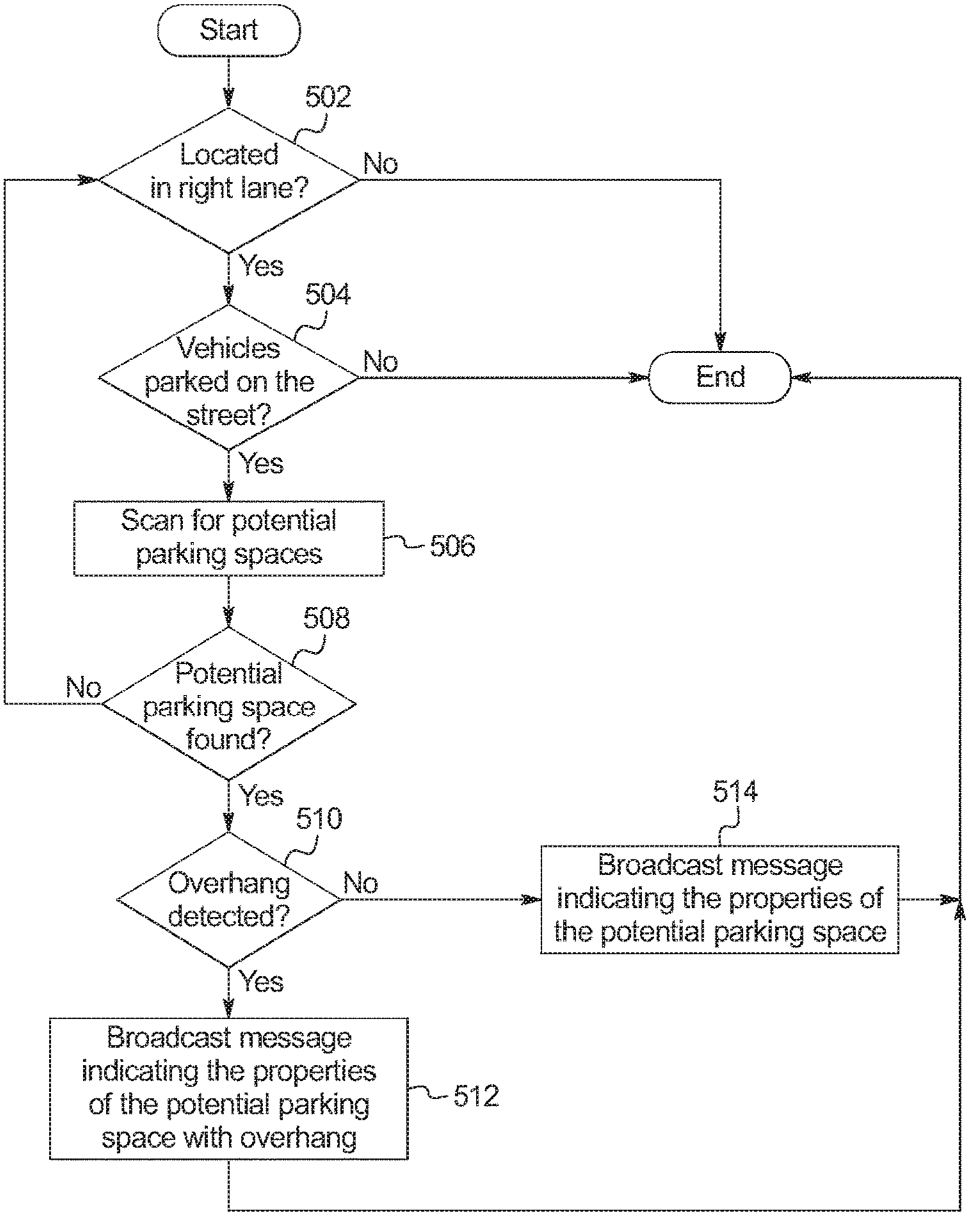

FIG. 5 is a flowchart of a method to notify other vehicles of the detected overhang 102 on a semitrailer 104, which may be implemented by the electronic components 300 of FIG. 3. Initially, at block 502, the parking assist unit 116 determines whether the vehicle 100 is located in the right lane. In some examples, the parking assist unit 116 determines that it is in the right lane through the navigation system and/or horizon data supplied by an Advance Driving Assistance system (ADASIS). More information regarding implementation of and information provided by the ADASIS is available in the "ADAS Protocol for Advanced In-Vehicle Applications" (available at http://durekovic.com/publications/documents/ADASISv2%20ITS%20NY%20Paper%20Final.pdf), which is hereby incorporated by reference in its entirety. At block 504, the parking assist unit 116 determines whether other vehicles are parked along the street on the right hand side of the vehicle 100. In some examples, the parking assist unit 116 uses the sensors 106 and 108 to detect parked vehicles. Alternatively or additionally, in some examples, the parking assist unit 116 receives information regarding street parking from the navigation system. At block 506, when the other vehicles are parked along the street on the right hand side of the vehicle 100 and/or when the navigation system indicates that there is valid street parking, the parking assist unit 116 operates the sensors 106 and 108 to scan for potential parking spaces.

At block 508, the parking assist unit 116 determines whether a potential parking space has been found. When the potential parking space has been found, the method continues at block 510. Otherwise, when the potential parking space has not been found, the method returns to block 502. At block 510, the parking assist unit 116 determines whether the potential parking space includes an overhang 102. When the potential parking space includes an overhang 102, the method continues at block 512. Otherwise, when the potential parking space does not include an overhang 102, the method continues at block 514. At block 512, the parking assist unit 116 broadcasts a message indicating the properties of the parking space as well as the properties of the overhang 102 via the DSRC module 114. Alternatively or additionally, the parking assist unit 116 provides the properties of the parking space and the overhang 102 to the navigation system. At block 514, the parking assist unit 116 broadcasts a message indicating the properties of the parking space via the DSRC module 114. Alternatively or additionally, the parking assist unit 116 provides the properties of the parking space to the navigation system.

Figure 6:
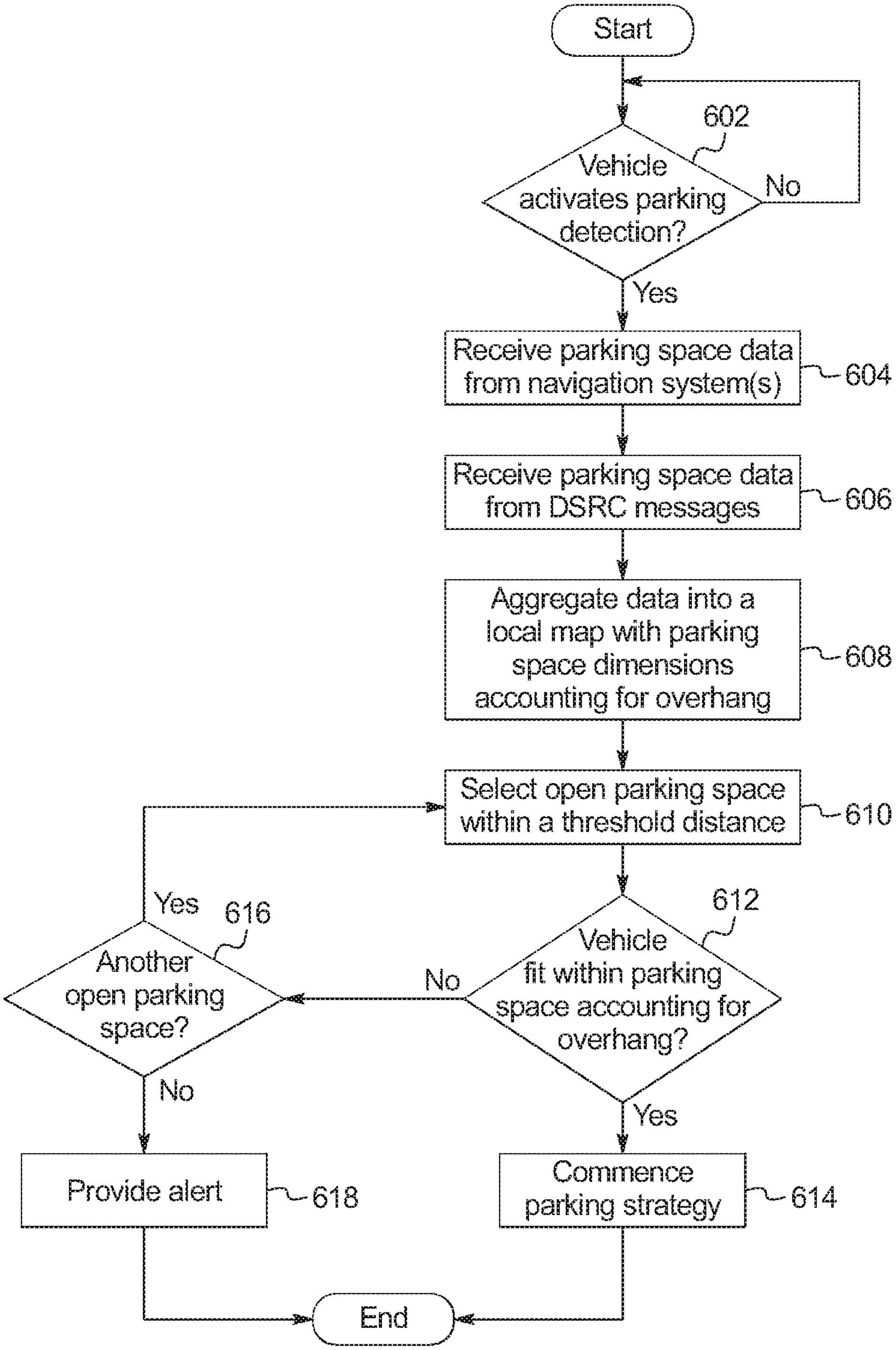
FIG. 6 is a flowchart of a method to locate a parking space, which may be implemented by the electronic components of FIG. 3.

FIG. 6 is a flowchart of a method to locate a parking space, which may be implemented by the electronic components of FIG. 3. Initially, at block 602, the parking assist unit 116 waits until the driver activates parking detection. At block 604, after the driver activates parking detection, the parking assist unit 116 receives parking space data (e.g., location, dimensions, presence of an overhang, etc.) from the navigation system. At block 606, the parking assist unit 116 receives parking space data (e.g., location, dimensions, presence of an overhang, time etc.) from messages received via the DSRC module 114. At block 608, the parking assist unit 116 aggregates the parking space data into a local map with parking space dimensions accounting for overhang. For example, the parking assist unit 116 may compile a list of potential parking spaces within a mile of the vehicle 100 that were reported within the last thirty minutes.

At block 610, the parking assist unit 116 selects one of the potential parking spaces. In some examples, the potential parking space is selected by distance (e.g., the closest, etc.) and/or by the report time (e.g., the most recent, etc.). At block 612, the parking assist unit 116 determines whether the vehicle 100 fits within the potential parking space selected at block 610 accounting for the dimensions of any detected overhang. When the vehicle 100 fits within the potential parking space, the method continues to block 614. Otherwise, when the vehicle 100 does not fit within the potential parking space, the method continues at block 616. At block 614, the parking assist unit 116 commences a parking strategy. For example, the parking assist unit 116 may direct the driver to the selected parking space, measure the dimensions of the parking space to confirm its size, calculate a trajectory into the parking space, and control the steering of the vehicle 100 into the parking space. At block 616, the parking assist unit 116 determines whether there is another potential parking space. If there is another potential parking space, the method returns to block 610. Otherwise, if there is not another potential parking space, the method continues to block 618. At block 618, the parking assist unit 116 provides an alert to the driver (e.g., via an indicator on the dashboard display, a message on the center console display, etc.).

The flowcharts of FIGS. 4, 5, and 6 are representative of machine readable instructions stored in memory (such as the memory 306 of FIG. 3) that comprise one or more programs that, when executed by a processor (such as the processor 304 of FIG. 3), cause the vehicle 100 to implement the example parking assist unit 116 of FIGS. 1, 2, and 3. Further, although the example program(s) is/are described with reference to the flowcharts illustrated in FIGS. 4, 5, and 6, many other methods of implementing the example parking assist unit 116 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
a first range detection sensor;
a second range detection sensor different from the first range detection sensor; and
a parking assist unit to:
detect, with the first and second range detection sensors, a second vehicle with an overhang adjacent to a parking space; and
broadcast, with a DSRC module, a message including a location and a first dimension of the parking space, a second dimension of the overhang, and a time.

2. The vehicle of claim 1, wherein the parking assist unit is to upload properties of the parking space to a navigation system.

3. The vehicle of claim 1, wherein the first range detection sensor is an ultrasonic sensor and the second range detection sensor is one of a camera or a LiDAR.

4. The vehicle of claim 1, wherein the parking assist unit is to detect the second vehicle with the overhang adjacent to the parking space when the vehicle is searching for the parking space.

5. The vehicle of claim 1, wherein the parking assist unit is to detect the second vehicle with then overhang adjacent to the parking space when the vehicle is not searching for the parking space and passes the parking space.

6. The vehicle of claim 1, wherein the second vehicle is a semitrailer.

7. The vehicle of claim 1, wherein the parking assist unit is to, when parking detection is activated:
aggregate a list of parking spaces within a threshold distance of the vehicle based on messages received via the DSRC module which include properties of the parking spaces; and
select a target parking space from the list of the parking spaces based on dimensions of the target parking space accounting for overhang and dimensions of the vehicle.

8. A method comprising:
detecting, with first and second range detection sensors, a first vehicle with an overhang adjacent to a parking space, the second range detection sensor different from the first range detection sensor;
determining properties of the parking space accounting for the overhang; and
broadcasting, with a DSRC module, a message including the properties of the parking space, the properties of the parking space including a location of the parking space, a first dimension of the parking space, a second dimension of the overhang, and a time.

9. The method of claim 8, including uploading the properties of the parking space to a navigation system.

10. The method of claim 8, wherein the first range detection sensor is an ultrasonic sensor and the second range detection sensor is one of a camera or a LiDAR.

11. The method of claim 8, including detecting the first vehicle with the overhang adjacent to the parking space when a second vehicle is searching for the parking space.

12. The method of claim 8, including detecting the first vehicle with the overhang adjacent to the parking space when a second vehicle is in motion and passing the parking space.

13. The method of claim 8, wherein the first vehicle is a semitrailer.

14. The method of claim 8, including, when parking detection is activated:
aggregating a list of parking spaces within a threshold distance of a second vehicle based on messages received via the DSRC module which include the properties of the parking spaces; and
selecting a target parking space from the list of the parking spaces based on dimensions of the target parking space accounting for overhang and dimensions of the second vehicle.

15. An overhang detection system for a vehicle comprising:
a first range detection sensor;
a second range detection sensor different from the first range detection sensor; and
a parking assist unit to:
detect, with the first and second range detection sensors, a second vehicle with an overhang adjacent to a parking space;
broadcast, with a DSRC module, a message including properties of the parking space accounting for the overhang;
aggregate a list of parking spaces within a threshold distance of the vehicle based on messages received via the DSRC module which include the properties of the parking spaces; and select a target parking space from the list of the parking spaces based on dimensions of the target parking space accounting for overhang and dimensions of the vehicle.

* * * * *